United States Patent [19]

Brandenstein et al.

[11] Patent Number: 4,557,708

[45] Date of Patent: Dec. 10, 1985

[54] TENSION ROLLER

[75] Inventors: Manfred Brandenstein, Eussenheim; Roland Haas, Hofheim; Gerhard Herrmann, Schweinfurt; Rüdiger Hans, Niederwerrn, all of Fed. Rep. of Germany

[73] Assignee: SKF Kugellagerfabriken GmbH, Schweinfurt, Fed. Rep. of Germany

[21] Appl. No.: 616,020

[22] Filed: Jun. 1, 1984

[30] Foreign Application Priority Data

Jun. 22, 1983 [DE] Fed. Rep. of Germany ... 8318103[U]

[51] Int. Cl.⁴ ............................................. F16H 7/10
[52] U.S. Cl. ..................................... 474/112; 474/199
[58] Field of Search ............................... 474/112, 199

[56] References Cited

U.S. PATENT DOCUMENTS 891,636   6/1908   Sandera ..................... 474/112 X
4,516,962 5/1985   Brandenstein et al. ............. 474/112

Primary Examiner—James A. Leppink
Assistant Examiner—Frank McKenzie
Attorney, Agent, or Firm—Daniel M. Rosen

[57] ABSTRACT

A tension roller for enabling adjustment of the tightness of a driving belt, comprising a solid support and a bearing press-fit thereon. The solid support has an axially extending mounting bore eccentrically arranged therein and a seating surface formed circumferentially thereon. A plurality of balanced bores are circumferentially distributed in the support in order to obtain a uniform radial elasticity at the seating surface. The balance bores may have a diameter equal to or less than the diameter of the mounting bore. In the latter case, the shortest distance between the balance bore surfaces and the seating surface is equal to the shortest distance between the mounting bore surface and the seating surface. The resultant uniformity of the radial elasticity prevents deformation of the bearing.

3 Claims, 3 Drawing Figures

TENSION ROLLER

BACKGROUND OF THE INVENTION

This invention relates to tension rollers which are rotatably mounted on machine parts for the purpose of enabling the adjustment of the tightness of a driving belt.

A tension roller of this type is disclosed in DE-GM No. 7203614, comprising a rolling bearing pressed onto the seating surface of a solid support. In order to ensure a sufficiently tight fastening, a relatively tight press fit must be provided whenever other fastening elements are not utilized. The support has an eccentric bore about which the tension roller is able to rotate and which at the same time is used to mount the tension roller to another machine part. As a result of the provision of this bore, the support has a variable radial elasticity about its circumference. The resilience is thus greater in the vicinity of the bore than it is in the remaining solid portion. For this reason, the inner ring of the bearing is deformed and, depending on the degree of press fit, deviates more or less from its ideal circular shape. This alone, during mounting of the bearing, causes severe conditions which often lead to the premature failure of the tension roller. Up until now this disadvantage could only be mitigated by maintaining the greatest possible distance between the eccentric bore and the seating surface, thereby providing sufficient material to increase the radial rigidity in the vicinity of the eccentric bore. For this reason, an optimization of the tightening capacity by means of the greatest possible eccentricity of the bore was not possible.

SUMMARY OF THE INVENTION

The object of the present invention is to provide a tension roller of the aforementioned type wherein the press-fit bearing retains its circular shape.

This object is achieved by providing a plurality of balance bores circumferentially distributed on the support along with the mounting bore and extending axially over at least the width of the seating surface for the bearing. By means of the balance bores the same physical conditions are obtained at their respective locations as occur at the fastening bore, whereby a uniform radial elasticity is attained at the seating surface for the bearing about the circumference of the support. In this way, the radial holding force acting against the bore surface of the bearing as a result of the press-fit is uniform over the circumference of the bore. Consequently, the present invention has the advantage that the bearing is deformed from its circular shape to an insignificant degree, whereby its initial characteristics remain unchanged and a considerably longer lifetime for the tension roller as a whole is attained. If the support of the tension roller of the invention is manufactured by an injection molding technique or flow molding, practically no additional manufacturing cost is incurred. If the support is made of solid material, the balance bores must be bored; however, if a multiple-spindle drill is used, no additional work steps are required. In all cases weight and, except in the case of the boring process, also material are saved. Owing to the relatively solid support body, the tension roller of the present invention is adapted for high tension loads and produces a directionally stable motion throughout the entire range of tension loads.

In accordance with one preferred embodiment, the balance bores have the same diameter as that of the mounting bore and are positioned with their axis along the same pitch circle as the mounting bore. Because the size of the bores and their distance to the seating surface of the bearing are the same, the radial elasticity in the area of the bores is also exactly equal. The best results are obtained when as many balance bores as possible are evenly distributed about the circumference.

In accordance with a further feature of the present invention, a plurality of small balance bores is circumferentially distributed whereby the smallest distance between their bore surfaces and the seating surface for the bearing is the same as that for the mounting bore. When the mounting bore is, for example, large in relation to the diameter of the seating surface, it is not geometrically possible to circumferentially distribute balance bores of corresponding size in sufficient number. In this case a large number of smaller balance bores are arranged on a pitch circle, their positions relative to the seating surface being selected such that a uniform radial elasticity is attained on the circumference of the entire seating surface.

BRIEF DESCRIPTION OF THE DRAWINGS

The tension roller according to the present invention will not be described in greater detail with reference to the following drawings.

DETAILED DESCRIPTION OF THE PREFERRED EMBODIMENTS

Figure 1:
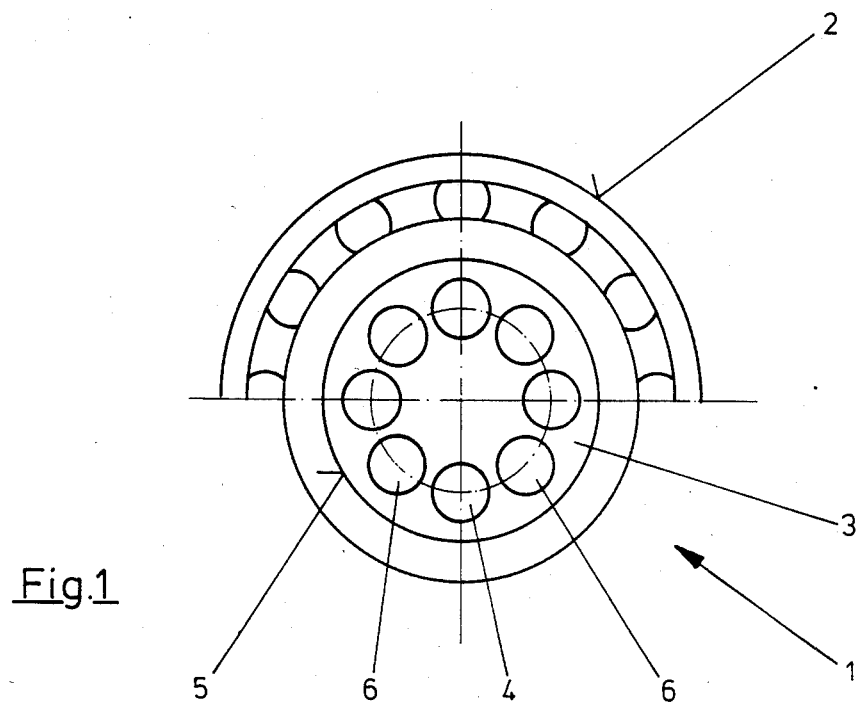
FIG. 1 is a partial side view of a tension roller with a fastening bore and balance bores of the same diameter.
Figure 2:
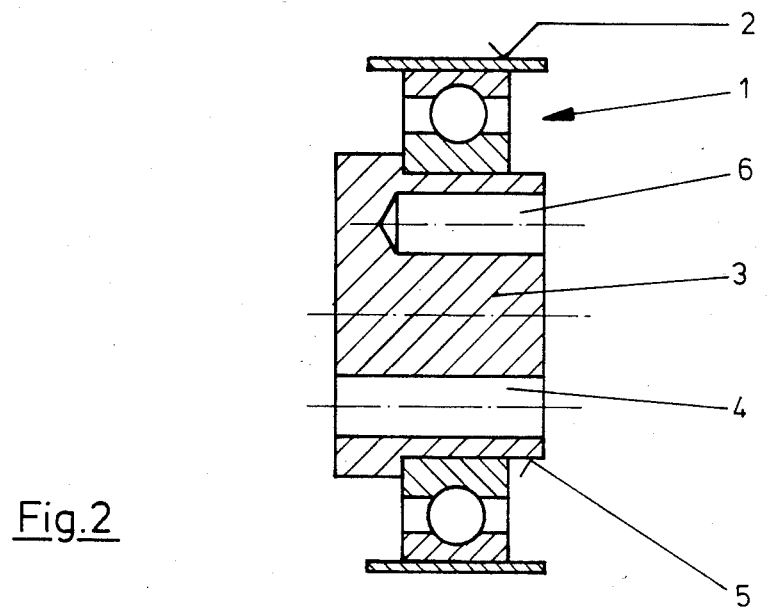
FIG. 2 is a plan view in section of the tension roller shown in FIG. 1.

The tension roller shown in FIGS. 1 and 2 comprises a ball bearing 1 (only partly shown) with an outer rolling surface 2 for a driving belt (not shown) and a solid support 3. The support 3 is provided with circumferentially distributed, axially extending bores, of which only one eccentric mounting bore 4 is utilized. The tension roller is mounted to a machine frame (not shown), by the use of this mounting bore 4, by means of a bolt (not shown). The tension roller is rotatably mounted on the bolt for the purpose of tightening the driving belt. In order to obtain the greatest possible tightening range, the mounting bore 4 is placed extremely far from the center line of the support whereby bore 4 lies only a small distance from the seating surface 5 of the ball bearing 1. Thus, the seating surface formed on support 3 in this situation manifests greater radial elasticity than does the seating surface formed on a solid support without such a mounting bore 4. In order to obtain the same conditions about the circumference of the seating surface, additional bores, having the same diameter and lying along a common pitch circle with mounting bore 4, are arranged as balance bores 6. This gives rise to a uniform radial elasticity over the circumference of the support 3, i.e., the seating surface, whereby unwanted deformation of the ball bearing 1 is avoided. The balance bores 6 must not extend completely through the support 3, but should extend at the very least over the entire width of seating surface 5.

Figure 3:
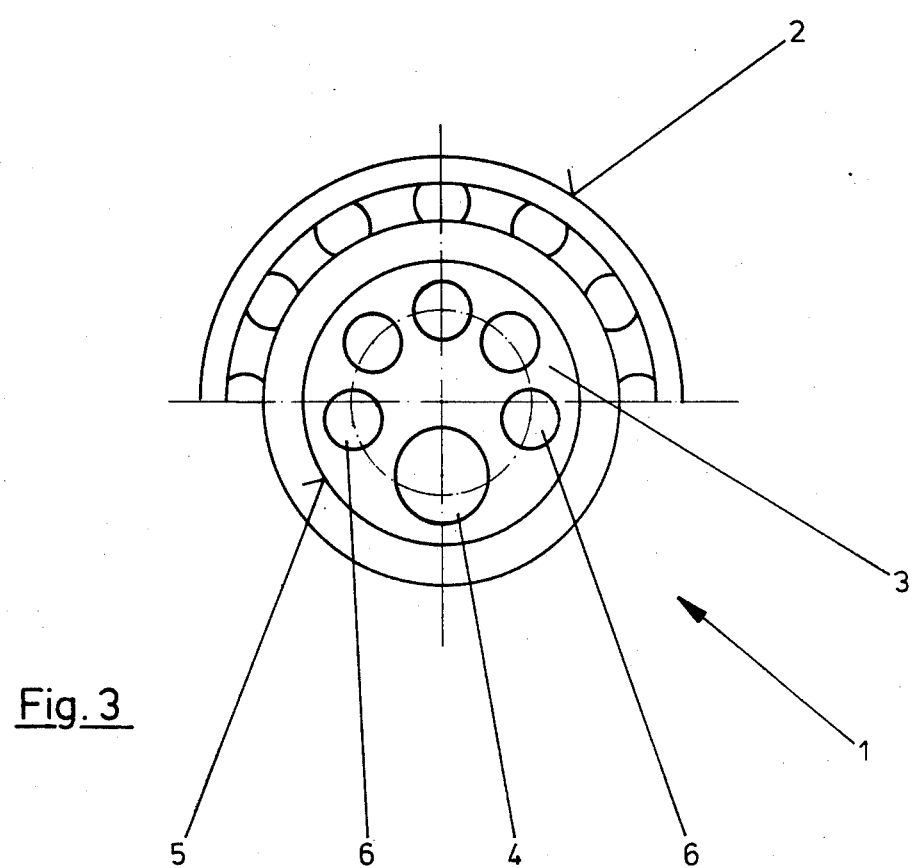
FIG. 3 is a partial side view of a tension roller with a relatively larger fastening bore and smaller balance bores.

The support 3 of the tension roller depicted in FIG. 3 is provided with a relatively large eccentric mounting bore 4. The balance bores 6 have smaller diameters. The balance bores 6 are arranged on a common pitch circle and are circumferentially distributed at regular intervals. The smallest distance between the bore surface and the seating surface for the ball bearing is the same for all bores, so that in this embodiment a uniform radial elasticity is also produced over the circumference of the support 3.

The above description of the preferred embodiments is presented for illustrative purposes only and is not intended to limit the scope of the present invention as recited in the appended claims. Modifications may be effected by one having ordinary skill in the art without departing from the spirit and scope of the inventive concept herein disclosed.

What is claimed is:

1. In a tension roller comprising a solid support body with an axially extending mounting bore eccentrically arranged therein, a seating surface formed circumferentially thereon, and a bearing press fit on said seating surface; the improvement comprising a plurality of balance bores circumferentially distributed in said support body, said balance bores extending axially for a length equal to at least the width of said seating surface.

2. A tension roller as claimed in claim 1 wherein said balance bores and said mounting bore have equal diameters and their axes lie on the same pitch circle.

3. A tension roller as claimed in claim 1 wherein said balance bores are smaller in diameter than said mounting bore, and the shortest distance from the bore surfaces of each of said balance bores to said seating surface is equal to the shortest distance from said mounting bore to said seating surface.

* * * * *